G. HUHN.
METAL PACKING RING.
APPLICATION FILED JAN. 6, 1913.
1,079,857. Patented Nov. 25, 1913.
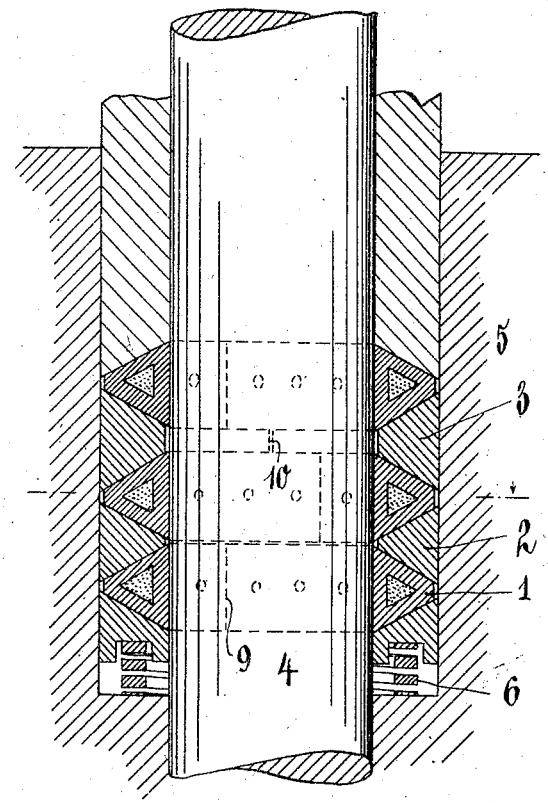
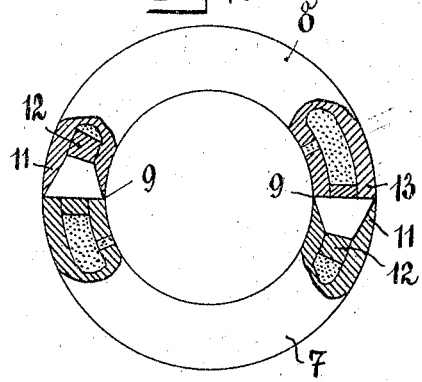
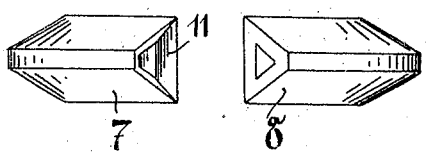
Inventor
Gustav Huhn.
Witnesses
E. D. Haines.
A. Van Loock
By H. B. Willson & Co
Attorneys

UNITED STATES PATENT OFFICE.

GUSTAV HUHN, OF BERLIN, GERMANY.

METAL PACKING-RING.

1,079,857.  Specification of Letters Patent.  Patented Nov. 25, 1913.

Application filed January 6, 1913. Serial No. 740,429.

*To all whom it may concern:*

Be it known that I, GUSTAV HUHN, manufacturer, citizen of Germany, subject of the King of Prussia and Emperor of Germany, residing at Berlin, in the Kingdom of Prussia and Empire of Germany, have invented new and useful Improvements in Metal Packing-Rings, of which the following is a specification.

A difficulty arises during the use of the ordinary divided metal packing rings owing to the fact that the ends of each ring section cannot at the outset be in close contact with each other because if this were so it would be impossible to tighten the packing ring into the plunger or shaft, and a leakage in the packing would very soon take place owing to the wearing away of the rings on the inside surface during use. Hitherto it has been essential to have the inside diameter of the sectional packing rings somewhat less than the diameter of the piston or shaft against which a closure has to be effected so that the extremities of each sectional ring are not in close contact when first applied. In order to prevent steam or other medium which has to be excluded from penetrating through the gap so formed between the two ends of the ring it has been the custom to arrange the gaps in the rings so that they lie one above the other in alternate or staggered positions. This expedient however is on the one hand incomplete and does not always attain its object especially in cases where the rings have to effect a closure alternately inward and outward *i. e.* against the plunger or shaft and against the interior wall of the stuffing box, as is especially the case in the stuffing boxes of certain super-heated steam locomotives.

By means of the present invention these defects are completely removed in all cases. For this purpose, one of the rings, which are preferably made of white metal, has one of its ends made hollow and with tapering or thin walls and the rings at the outset are formed with the same inner diameter as that of the plunger or shaft so that the ends of sectional rings fit quite closely at the outset and the harmful gap which allows steam to penetrate is thus avoided. In packings hitherto used immediately the meeting ends of the sectional rings came into contact it was impossible to further tighten the rings onto the plunger or shaft against which they form a closure, and to overcome this the packing had to be removed and the abutting ends of the rings filed away to enable the rings to be further tightened onto the plunger or shaft. This work is very objectionable particularly in locomotive packings and is obviated by the application of my invention. As here the ring walls of one of the abutting or meeting ends of the sectional rings are formed of thin metal so these thin walls are partly pressed up or compressed during adjustment, and in part are rapidly worn away by the vibrating motion which occurs during working and by the friction which arises from the contact of the abutting ends. The relative sectional ring is consequently shortened on its thinned end in proportion to the wearing away of the interior bearing surface. The close contact of the interior surface of the ring with the rod and the close contact of the abutting ends of the ring are consequently permanently maintained.

The invention is applicable to all kinds of metal rings and is especially suitable for white metal rings of the known description which are formed hollow and filled with lubricant and provided with outlet openings therefor on the inside of the ring.

In the drawing a method of executing the object of the invention is illustrated.

Figure 1 shows a vertical section through a stuffing box provided with such rings. Fig. 2 is a top view partly in section of a hollow ring made up of two sectional rings, and Fig. 3 the two abutting ends of such a sectional ring in perspective in separated position.

The stuffing box packing shown in Fig. 1 consists alternately of hollow white metal rings 1 filled with lubricant and provided on the inside with outlet openings, and solid rings 2 and 3. Both kinds of rings, the hollow as well as the solid are made wedge shaped in such a way that the hollow rings 1 are pressed against the plunger or spindle 4 and the solid rings 2 and 3 against the wall of the stuffing box 5. A spring 6 of the known type at the bottom of the stuffing box serves for exercising pressure on the rings. In the method of execution illustrated the solid rings 2 and 3 are made of cast iron or copper bronze while the hollow rings 1 are of white metal. It is to be noticed that the sectional rings 7 and 8 (see Figs. 2 and 3) are in close contact at their abutting ends 9 whereas in the case of the solid rings 2 and 3, this is not so as may be seen at 10 because these rings are forced outward away from the spindle.

In order now, in spite of the close contact of the sectional rings 7 and 8, to render possible a tightening after wear, at the one end of each of the sectional rings the walls are made thin as shown at 11. In the method of execution illustrated this is accomplished by the walls of the hollow rings at the respective ends tapering off into wedge or pyramid shape. The closing stopper 12 is at these ring ends placed correspondingly deep in the interior of the sectional ring so that the thin walled ring ends are situated at the outside of the stopper 12. The abutting end 13 of the other sectional ring has the usual construction, i. e. the sectional ring has normal wall thickness at this end and correspondingly the closing stopper also is placed here in its usual position.

Instead of making the walls thin by a wedge shape reduction of them they may be made thin all the way down by setting off the ends of the walls against their other part so that the walls at the end of the ring are of uniform thinness. Instead of one end of each sectional ring being made thin in its walls in this way, both ends of one section may of course be provided with thin walls and this sectional ring may then be used with a normal ring section. However the method shown in the example of execution illustrated is to be preferred as a rule because in this case only one sort of sectional ring needs to be manufactured in which the one end is provided with thin walls.

Having now described my invention what I claim and desire to secure by Letters Patent of the United States is:

1. A divided metal packing ring with tube like hollow ends, at least one of said abutting hollow ends of the sectional rings having thin walls, so that these thin walls may be worn away by the pressure and the vibrating friction of the abutting ring end in proportion to the wearing away of the interior bearing surface of the ring.

2. A metal packing ring composed of sections one of the abutting ends of said sections being hollow and having thin walls.

3. A divided metal packing ring with tube like hollow ends, at least one of said abutting hollow ends of the sectional rings having thin walls, the outsides of said thin walls lying in the same planes as the outside of the normal parts of said sectional rings.

4. A divided metal packing ring composed of sectional rings, one end of each of said sectional rings being hollow and having thin walls, the other end being normal.

5. A divided hollow metal packing ring composed of sectional hollow rings of white metal and filled with lubricant, one of the abutting ends of said sectional hollow rings having thin walls, the abutting end of the neighboring ring being normal.

6. A divided hollow metal packing ring composed of sectional hollow rings of white metal and filled with lubricant, one of the abutting ends of said sectional hollow rings having thin walls, the abutting end of the neighboring ring being normal, and closing stoppers at said thinned ends of the sectional hollow rings lying countersunk behind said thinned parts of the walls of said sectional rings.

7. A divided metal packing ring having hollow ends, one of the said hollow ends having thin walls, said walls being reduced on their inner faces to cause the outer faces of said walls to lie in the same plane as the outer faces of the normal parts of the ring sections.

In testimony whereof I have hereunto set my hand in presence of two subscribing witnesses.

GUSTAV HUHN.

Witnesses:
 WOLDEMAR HAUPT,
 HENRY HASPER.